United States Patent
Callahan et al.

(10) Patent No.: US 10,044,077 B2
(45) Date of Patent: Aug. 7, 2018

(54) RECHARGEABLE BATTERY INCLUDING BATTERY CELL SEPARATORS

(71) Applicant: The Boeing Company, Chicago, IL (US)

(72) Inventors: Kevin S. Callahan, Shoreline, WA (US); Bruce L. Drolen, Altadena, CA (US); James C. Russell, Bellevue, WA (US); John R. Lowell, Fairfax, VA (US); Thomas P. Barrera, Long Beach, CA (US); Timothy R. North, Dickinson, TX (US)

(73) Assignee: The Boeing Company, Chicago, IL (US)

( * ) Notice: Subject to any disclaimer, the term of this patent is extended or adjusted under 35 U.S.C. 154(b) by 121 days.

(21) Appl. No.: 14/188,663

(22) Filed: Feb. 24, 2014

(65) Prior Publication Data

US 2014/0242435 A1    Aug. 28, 2014

Related U.S. Application Data

(60) Provisional application No. 61/769,328, filed on Feb. 26, 2013.

(51) Int. Cl.
*H01M 10/613* (2014.01)
*H01M 2/10* (2006.01)
*H01M 10/625* (2014.01)
*H01M 10/658* (2014.01)
*H01M 10/0525* (2010.01)
*H01M 10/647* (2014.01)

(52) U.S. Cl.
CPC ....... *H01M 10/613* (2015.04); *H01M 2/1077* (2013.01); *H01M 10/625* (2015.04); *H01M 10/658* (2015.04); *H01M 10/0525* (2013.01); *H01M 10/647* (2015.04); *H01M 2200/00* (2013.01); *H01M 2220/20* (2013.01); *Y02E 60/122* (2013.01)

(58) Field of Classification Search
CPC ...................................................... H01M 10/50
USPC ......................................................... 429/120
See application file for complete search history.

(56) References Cited

U.S. PATENT DOCUMENTS 5,437,939 A    8/1995  Beckley
6,255,015 B1   6/2001  Corrigan et al.
(Continued)

FOREIGN PATENT DOCUMENTS

CN    101689617 A    3/2010
CN    101796666 A    8/2010
(Continued)

OTHER PUBLICATIONS

Chinese Office Action for Related Patent Application No. 2014800107435; Report dated Feb. 6, 2017.
(Continued)

*Primary Examiner* — James Lee
(74) *Attorney, Agent, or Firm* — Miller, Matthias & Hull LLP

(57) ABSTRACT

A rechargeable battery comprises a plurality of individual sealed battery cells, and dielectric separators between the battery cells for creating thermal barriers between opposing surfaces of the battery cells. The dielectric separators are made of a fiber composite.

17 Claims, 4 Drawing Sheets

(56) References Cited

U.S. PATENT DOCUMENTS

| | | | |
|---|---|---|---|
| 6,855,393 B1* | 2/2005 | Ayres | B32B 3/12 156/306.9 |
| 6,864,013 B2 | 3/2005 | Gow et al. | |
| 8,252,441 B2 | 8/2012 | Planck | |
| 8,916,282 B1* | 12/2014 | Bohman et al. | 429/120 |
| 2003/0077505 A1* | 4/2003 | Goda et al. | 429/56 |
| 2003/0232239 A1 | 12/2003 | Gow et al. | |
| 2008/0254359 A1* | 10/2008 | Byun | H01M 10/46 429/163 |
| 2009/0004555 A1* | 1/2009 | Lohr | H01M 2/105 429/120 |
| 2010/0136404 A1 | 6/2010 | Hermann et al. | |
| 2010/0183910 A1* | 7/2010 | Nishino | H01M 10/0431 429/163 |
| 2010/0330404 A1* | 12/2010 | Nishino | H01M 2/105 429/82 |
| 2011/0159340 A1 | 6/2011 | Hu et al. | |
| 2012/0121963 A1 | 5/2012 | Kwon et al. | |
| 2012/0129022 A1* | 5/2012 | Kalish | H01M 2/1077 429/72 |
| 2013/0011702 A1 | 1/2013 | Horne et al. | |
| 2013/0207596 A1* | 8/2013 | Zichner et al. | 320/107 |
| 2014/0038030 A1 | 2/2014 | Goesmann | |

FOREIGN PATENT DOCUMENTS

| | | |
|---|---|---|
| CN | 101952992 A | 1/2011 |
| EP | 2375471 A2 | 12/2011 |
| JP | 2000306560 A | 11/2000 |
| JP | 2009193691 A | 8/2009 |
| JP | 2011222202 A | 11/2011 |
| JP | 2012033419 A | 2/2012 |
| WO | 2004064082 A2 | 7/2004 |

OTHER PUBLICATIONS

Chinese Office Action for Related Patent Application No. 2014800107435; Report dated Aug. 18, 2017.
Chinese Office Action for Related Patent Application No. 2015559316; Report dated Jan. 23, 2018.
Chinese Office Action for Related Patent Application No. 2014800107435 Report dated Feb. 27, 2018.

* cited by examiner

FIG. 5
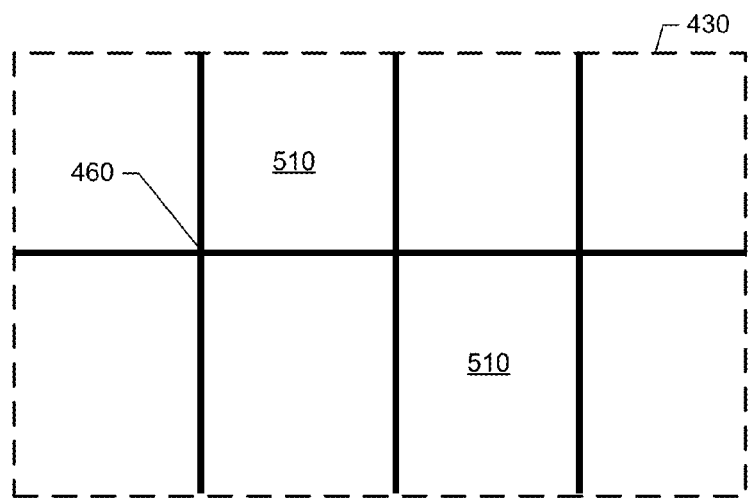
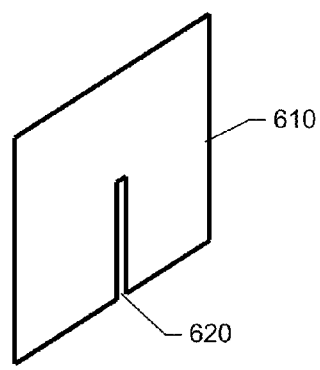
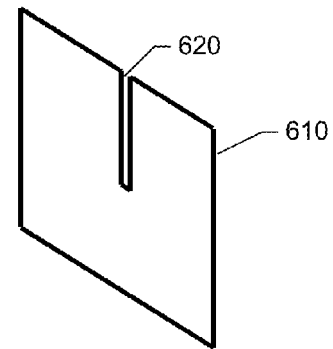
FIG. 6A
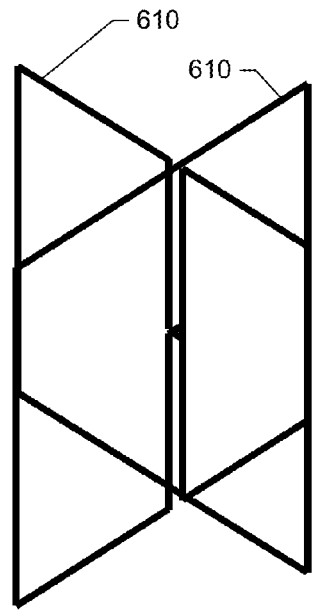
FIG. 6B

RECHARGEABLE BATTERY INCLUDING BATTERY CELL SEPARATORS

This application claims the benefit of provisional application 61/769,328 filed 26 Feb. 2013, which is incorporated herein by reference.

BACKGROUND

Lithium-ion (Li-ion) batteries (LIBs) are desirable for mobile computing devices, certain automobiles, and certain aircraft. They have lower weight and higher energy density than rechargeable batteries such as nickel metal hydride and nickel cadmium batteries. They have no memory degradation.

However, certain lithium-ion batteries have longstanding issues with thermal runaway. As used herein, thermal runaway means a situation where an increase in temperature causes a further increase in temperature that may lead to decreased efficiency. For example, heat generated from an exothermic chemical reaction may increase the rate of the chemical reaction. Designers of complex systems may address such inefficiencies in various ways.

SUMMARY

According to an embodiment herein, a rechargeable battery comprises a plurality of individual sealed battery cells, and dielectric separators between the battery cells for creating thermal barriers between opposing surfaces of the battery cells. The dielectric separators are made of a fiber composite.

According to another embodiment herein, a rechargeable battery comprises a lattice of dielectric separators, and an array of battery cells populating spaces formed by the lattice. The dielectric separators are configured to prevent propagation of thermal runaway between the battery cells. The dielectric separators are composed of fibers in a phenolic resin matrix.

According to another embodiment herein, an apparatus for preventing thermal runaway from propagating in an array of rechargeable battery cells comprises a plurality of dielectric separators that are interlocked to form a lattice. The lattice forms spaces for the battery cells to populate. The dielectric separators are composed of fibers in a phenolic resin matrix.

These features and functions may be achieved independently in various embodiments or may be combined in other embodiments. Further details of the embodiments can be seen with reference to the following description and drawings.

BRIEF DESCRIPTION OF THE DRAWINGS

FIG. 5 is an illustration of a lattice of dielectric separators for a rechargeable battery.

FIGS. 6A and 6B are illustrations of a plurality of dielectric separators that are configured for assembly into a lattice.

DETAILED DESCRIPTION

Figure 1:
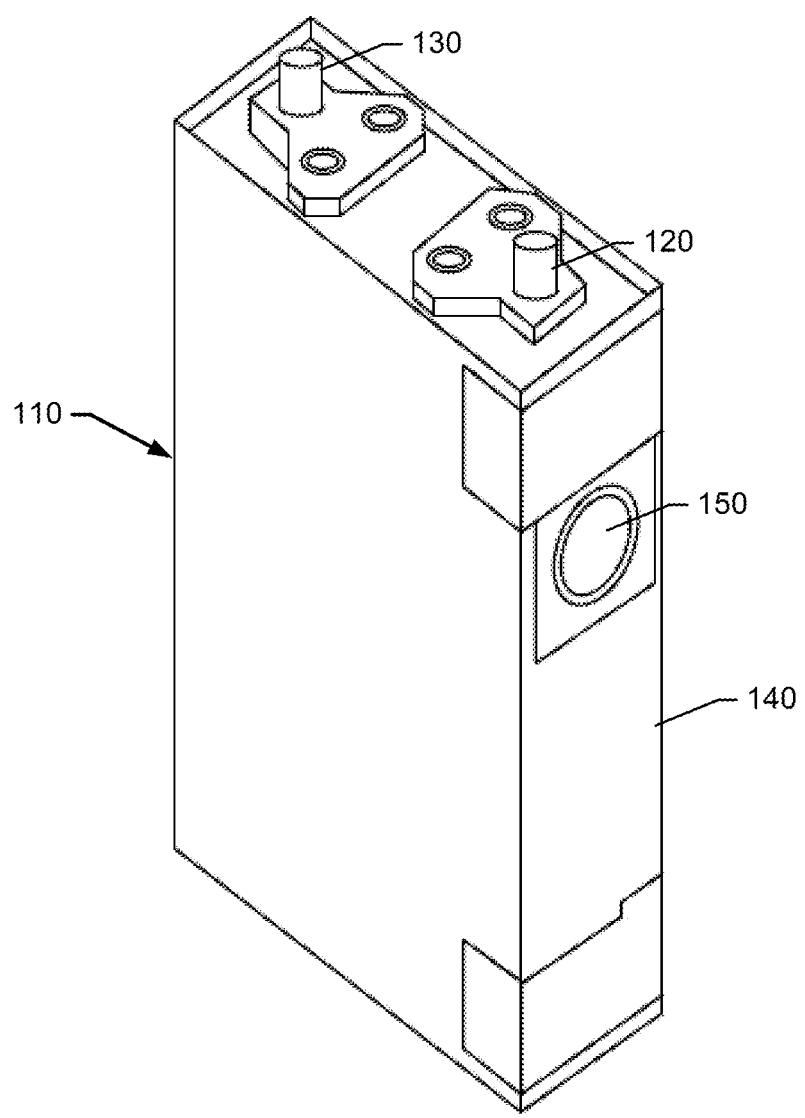
FIG. 1 is an illustration of a rechargeable battery cell.

Reference is made to FIG. 1, which illustrates a rechargeable battery cell 110. The battery cell 110 includes positive and negative electrodes 120 and 130, a case 140 for the electrodes 120 and 130, and electrolyte (not shown) sealed within the case 140.

The battery cell 110 is not limited to any particular chemistry. Examples include, but are not limited to lithium-ion, metal-cadmium, and nickel metal hydride. Depending on the battery chemistry, the battery cell 110 may be susceptible to thermal runaway.

The battery cell 110 has a vent hole (not shown) at the side of its case 140, and a rupture plate 150 covering the vent hole. The rupture plate 150 may be a stainless steel membrane that is resistance welded to the case 140. The rupture plate 150 is designed to open at a predetermined internal cell pressure (which may be caused by thermal runaway) and uncover the vent hole. Once the vent hole has been uncovered, materials from inside the case 140 may be expelled through the vent hole.

The battery cell 110 is not limited to any particular geometry. For example, the battery cell may 110 be prismatic or cylindrical. FIG. 1 shows a battery cell 110 that is prismatic.

Figure 2:
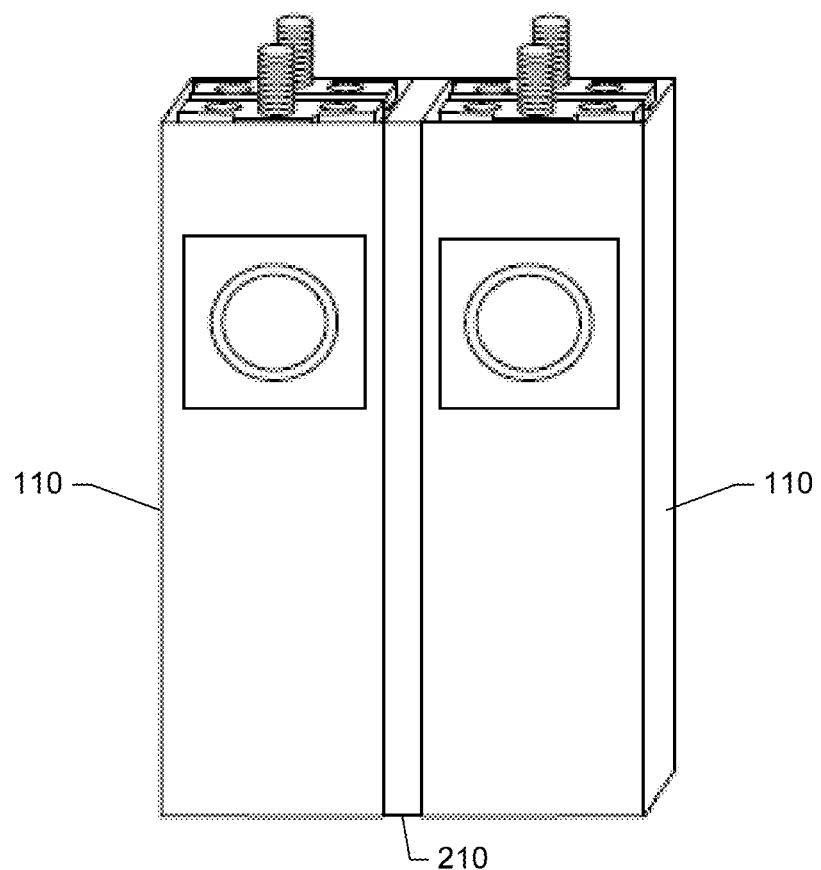
FIG. 2 is an illustration of two rechargeable battery cells separated by a dielectric separator.

Reference is now made to FIG. 2, which illustrates two battery cells 110 that are separated by a dielectric separator 210. The dielectric separator creates a thermal barrier between opposing surfaces of the battery cells 110. The primary purpose of the dielectric separator 210 is to prevent thermal runaway from propagating from one of the battery cells 110 to the other of the battery cells 110. A secondary purpose is to prevent unintended current paths from forming between the battery cells 110. The dielectric separator 210 provides thermal insulation, and it maintains minimum spacing between the battery cells 110.

The dielectric separator 210 may cover at least the entirety of each opposing battery cell surface. FIG. 2 shows the dielectric separator 210 having the same height and width as the battery cells 110.

A thickness and composition of the dielectric separator 210 are selected to prevent thermal runaway from propagating. Consider the example of a battery cell 110 that reaches a temperature of 900° F. during thermal runaway. The dielectric separator 210 is designed to provide thermal and electrical insulation above this temperature.

The selected material may be a fiber composite in which fibers are embedded in a matrix. The fibers and the matrix can withstand the high temperatures of thermal runaway. Examples of such fibers include, but are not limited to, quartz fibers, ceramic fibers, and silicon carbide fibers. An example of such a matrix is a phenolic resin matrix.

In some embodiments, the dielectric separator 210 is composed of a glass fiber phenolic. The glass fiber phenolic includes plies of fiberglass reinforcing fibers in a resin. The dielectric separator 210 may be formed as a laminate. The plies may be symmetric to prevent warping during manufacture.

In some embodiments, the dielectric separator is composed of fiber basalts, which is made from extremely fine fibers of basalt. The fiber basalts may be composed of the minerals plagioclase, pyroxene, and olivine.

Figure 3:
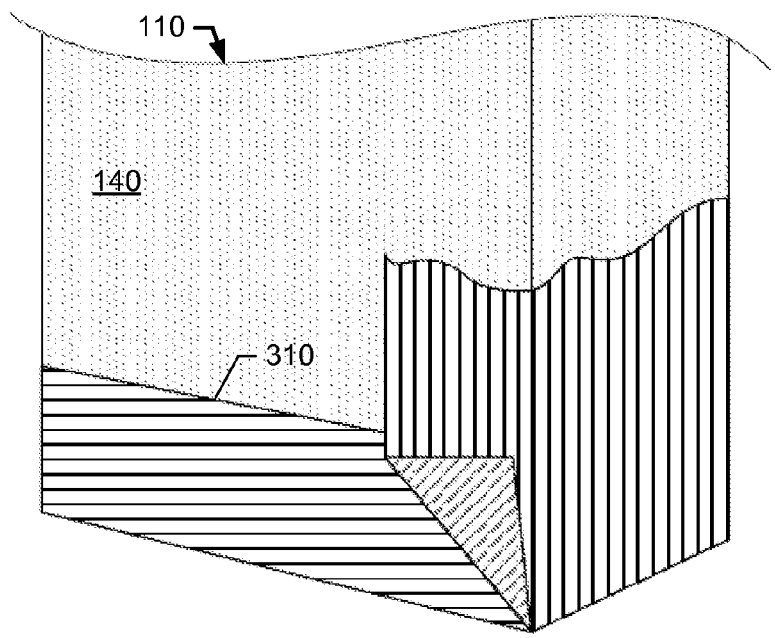
FIG. 3 is an illustration of a battery cell wrapped with a polyimide film.

Reference is now made to FIG. 3. Edges of the case 140 of each battery cell 110 may be wrapped with a polyimide film 310. An example of the polyimide film 310 is Kapton® tape. The polyimide film 310 is beneficial for rechargeable batteries subject to chronic moisture ingress. In an aircraft, for instance, the batteries may be subject to chronic moisture ingress. The polyimide film 310 prevents moisture from conducting current between the surfaces of adjacent battery cells 110.

A rechargeable battery may include a plurality of battery cells 110 and dielectric separators 210 between opposing surfaces of the battery cells 110. The rechargeable battery is not limited any particular arrangement of battery cells 110. However, the dielectric separators 210 enable powerful lithium ion battery cells 110 to be arranged in a dense array. An example of such an arrangement is illustrated in FIG. 4.

Figure 4:
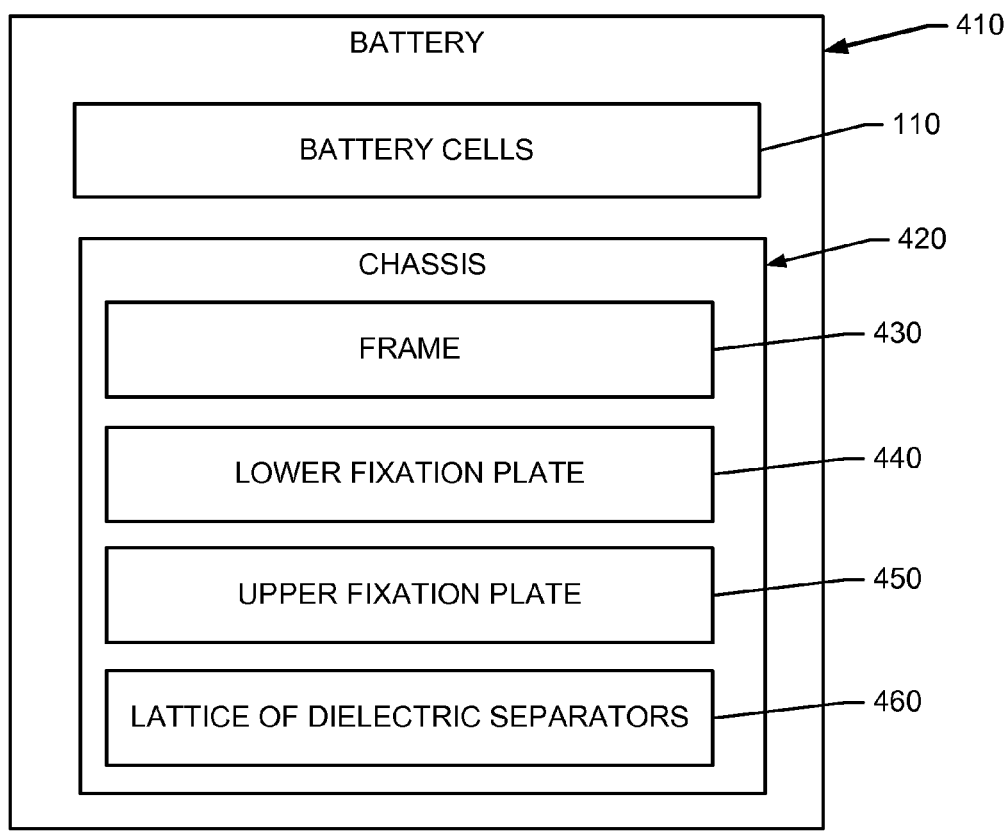
FIG. 4 is an illustration of a rechargeable battery including a plurality of battery cells.

Reference is made to FIG. 4, which illustrates a rechargeable battery 410 including a plurality of battery cells 110 and a chassis 420 for containing the battery cells 110. The chassis 420 includes a metal frame 430, a lower fixation plate 440, and an upper fixation plate 450. The lower fixation plate 440 is located at the bottom of the frame 430.

The chassis 420 further includes a lattice 460 of the dielectric separators 210. The lattice forms 460 an array of openings. Each battery cell 110 is populates one of the openings. The lattice ensures that opposing surfaces of any two of the battery cells 110 are separated by a dielectric separator 210.

Reference is made to FIG. 5, which illustrates an example of a lattice 460 of dielectric separators 210 for an 4×2 array of battery cells 110. The lattice 460 is placed in the frame 430, on the lower fixation plate 440 (the frame 430 is shown in dash lines to distinguish it from the lattice 460). When contained within the frame 430, the lattice 460 of FIG. 5 forms eight openings 510 (one opening 510 per battery cell 110).

Reference is once again made to FIG. 4. After the battery cells 110 have been placed in their openings, the upper fixation plate 450 is located over the battery cells 110 and fastened to the frame 430 to restrain the battery cells 110 within the frame 430. The lower and upper fixation plates 440 and 450 may be constructed of a non-conductive material so as to avoid case-to-case 140 shorting. Anode and cathode studs extending vertically from the top of the battery cells 110 are connected with copper bus bars to form a series connection (the $n^{th}$ cell's anode is connected to the $n+1^{th}$ cell's cathode).

Capacity and power of the battery 410 are dictated by the type of platform for which the battery 410 is intended. In some embodiments, the battery 410 may include lithium-ion battery cells 110, and the battery 410 may be configured for a passenger vehicle (e.g., aircraft, automobile, truck, bus, train, or boat).

The lattice 460 may be a unitary structure. In the alternative, the lattice 460 may be assembled from a plurality of individual dielectric separators.

Reference is made to FIG. 6A, which illustrates two dielectric separators 610 that can be assembled into a lattice. Each separator 610 includes a slot 620 for interlocking with the other separator 610. To interlock the two separators 610, their slots 620 are aligned, and the separators are forced together.

Reference is made to FIG. 6B, which shows the two separators 610 assembled together with their slots 620 mated. Advantageously, the separators 610 are interlocked without the use of fasteners or adhesive.

A larger lattice may utilize separators 610 having more than one slot. The lattice 460 of FIG. 5 may be formed, for instance, by a lengthwise separator having three slots, and three crosswise separators having a single slot.

The invention claimed is:

1. A rechargeable battery comprising:
a plurality of individual sealed battery cells;
a chassis for containing the battery cells, the chassis including:
a frame defining an interior space;
upper and lower fixation plates provided at a top and a bottom, respectively, of the frame and formed of a non-conductive material, the upper fixation plate fastened to the frame;
an imperforate dielectric separator disposed in the frame and configured to divide the frame interior space into a plurality of openings, the dielectric separator being formed of a fiber composite;
wherein each opening of the plurality of openings receives an associated, single battery cell and is bounded by the dielectric separator, the frame, and the upper and lower fixation plates; and
wherein the dielectric separator, the frame, and the upper and lower fixation plates are sized to completely enclose each opening, thereby covering an entire surface area of the single, associated battery cell disposed within each opening to create a complete thermal barrier between adjacent openings and to electrically isolate each battery cell from all other battery cells to prevent current paths between the battery cells.

2. The battery of claim 1, wherein each battery cell includes first and second electrodes, a case for the electrodes, and electrolyte sealed within the case.

3. The battery of claim 1, wherein the fiber composite includes fibers in a phenolic resin matrix.

4. The battery of claim 1, wherein the fiber composite includes a glass fiber phenolic.

5. The battery of claim 1, wherein the fiber composite includes fiber basalts.

6. The battery of claim 1, wherein each battery cell is wrapped with a polyimide film.

7. The battery of claim 1, wherein the battery cells are prismatic and the battery cells are arranged in an array, the battery further including a plurality of imperforate dielectric separators formed as a lattice.

8. The battery of claim 7, wherein the dielectric separator comprises at least two interlockable dielectric separator pieces.

9. The battery of claim 7, wherein the battery cells are lithium-ion battery cells, and wherein the battery is configured for a passenger vehicle.

10. A rechargeable battery comprising:
a chassis including:
a frame defining an interior space;
upper and lower fixation plates provided at a top and a bottom, respectively, of the frame and formed of a non-conductive material, the upper fixation plate fastened to the frame; and
a lattice of imperforate dielectric separators disposed in the frame and dividing the frame interior space into a plurality of openings, the lattice of dielectric separators composed of fibers in a phenolic resin matrix;
wherein each opening of the plurality of openings receives an associated, single battery cell and is bounded by the dielectric separator, the frame, and the upper and lower fixation plates; and
wherein the lattice of imperforate dielectric separators, the frame, and the upper and lower fixation plates are sized to completely enclose each opening, thereby covering an entire surface area of the single, associated battery cell disposed within each opening, to create a complete thermal barrier between adjacent openings and to electrically isolate each battery cell from all other battery cells to prevent current paths between the battery cells.

11. The battery of claim 10, wherein the lattice of dielectric separators are composed of glass fiber phenolic.

12. The battery of claim 10, wherein the lattice of dielectric separators comprises interlockable dielectric separators.

13. The battery of claim 10, wherein the battery cells are lithium-ion battery cells, and wherein the battery is configured for a passenger vehicle.

14. Apparatus for preventing thermal runaway from propagating in an array of rechargeable battery cells, the apparatus comprising:
- a frame defining an interior space;
- a lower fixation plate provided at a bottom of the frame and formed of a non-conductive material;
- an upper fixation plate provided at a top of the frame and formed of a non-conductive material, the upper fixation plate fastened to the frame; and
- a plurality of imperforate dielectric separators that are interlocked to form a lattice, the lattice being disposed in the frame and dividing the frame interior space into a plurality of openings;

wherein each opening of the plurality of openings receives an associated, single battery cell and is bounded by the dielectric separator, the frame, and the upper and lower fixation plates; and wherein the plurality of imperforate dielectric separators, the frame, and the upper and lower fixation plates are sized to completely enclose each opening, thereby covering an entire surface area of the single, associated battery cell disposed within each opening, to create a complete thermal barrier between adjacent openings and to electrically isolate each battery cell from all other battery cells to prevent current paths between the battery cells.

15. The apparatus of claim 14, wherein the dielectric separators are composed of glass fiber phenolic.

16. The apparatus of claim 14, wherein dielectric separators are configured for an array of prismatic lithium-ion battery cells.

17. The apparatus of claim 14, wherein the fibers include quartz fibers, ceramic fibers, or silicon carbide fibers.

* * * * *